(12) United States Patent
Le Loarer

(10) Patent No.: US 12,174,588 B2
(45) Date of Patent: Dec. 24, 2024

(54) TIMEPIECE COMPONENT MADE OF FORGED COMPOSITE

(71) Applicant: Manufacture d'Horlogerie Audemars Piguet SA, Le Brassus (CH)

(72) Inventor: Thibaut Le Loarer, Chavannaz (FR)

(73) Assignee: Manufacture d'Horlogerie Audemars Piguet SA, Le Brassus (CH)

( * ) Notice: Subject to any disclaimer, the term of this patent is extended or adjusted under 35 U.S.C. 154(b) by 0 days.

(21) Appl. No.: 17/020,452

(22) Filed: Sep. 14, 2020

(65) Prior Publication Data

US 2021/0088976 A1 Mar. 25, 2021

(30) Foreign Application Priority Data

Sep. 23, 2019 (CH) .................................... 01215/19

(51) Int. Cl.
*G04B 29/02* (2006.01)
*G04B 37/22* (2006.01)

(52) U.S. Cl.
CPC ......... *G04B 29/027* (2013.01); *G04B 37/225* (2013.01); *G04B 37/22* (2013.01)

(58) Field of Classification Search
CPC .......................... G04B 37/221; G04B 37/225
See application file for complete search history.

(56) References Cited

U.S. PATENT DOCUMENTS

| 8,171,567 | B1* | 5/2012 | Fraser | G06K 7/10792 |
| | | | | 726/32 |
| 2005/0014925 | A1 | 1/2005 | Yokota et al. | |
| 2006/0164925 | A1* | 7/2006 | Endo | G04B 13/021 |
| | | | | 368/324 |
| 2011/0259677 | A1 | 10/2011 | Dudde et al. | |
| 2013/0182987 | A1* | 7/2013 | Himeno | F16C 33/4635 |
| | | | | 384/456 |
| 2014/0254111 | A1* | 9/2014 | Yamazaki | G04G 9/0088 |
| | | | | 361/749 |
| 2014/0355395 | A1 | 12/2014 | Avril et al. | |
| 2015/0045517 | A1* | 2/2015 | Takahashi | C08L 79/02 |
| | | | | 525/411 |
| 2018/0305543 | A1* | 10/2018 | Agrawal | C08K 3/08 |
| 2019/0091721 | A1* | 3/2019 | Abe | C23C 18/22 |
| 2019/0243307 | A1* | 8/2019 | Tamura | G04C 3/14 |

(Continued)

FOREIGN PATENT DOCUMENTS

| CN | 1683712 A | 10/2005 |
| CN | 1948816 A | 4/2007 |
| JP | 2004/331801 A | 11/2004 |

(Continued)

OTHER PUBLICATIONS

Uchihama, English Translation of WO2019066028, originally published Apr. 4, 2019, retrieved from Espacenet on Aug. 27, 2022, full document (Year: 2019).*

(Continued)

*Primary Examiner* — Edwin A. Leon
*Assistant Examiner* — Jason M Collins
(74) *Attorney, Agent, or Firm* — BLANK ROME LLP

(57) ABSTRACT

The present invention relates to a timepiece component (100) made up of a polymer-based matrix (110) and a reinforcement (120) that consists of at least two different kinds of cut fibres (121, 122), one of which is a polyazole.

13 Claims, 1 Drawing Sheet

(56) References Cited

U.S. PATENT DOCUMENTS

2019/0307205 A1    10/2019  Bagheri et al.
2019/0314903 A1*   10/2019  Haenle ...................... B23C 5/04

FOREIGN PATENT DOCUMENTS

| | | | | |
|---|---|---|---|---|
| JP | WO2003030097 | * | 1/2005 | ............. B42D 25/36 |
| JP | 2005/239806 A | | 9/2005 | |
| JP | 2009/024057 A | | 2/2009 | |
| JP | 2009/292861 A | | 12/2009 | |
| JP | 2015/500474 A | | 1/2015 | |
| WO | WO-2019066028 A1 | * | 4/2019 | ............. B29C 70/06 |

OTHER PUBLICATIONS

English Translation of Jp WO2003030097, originally published on Jan. 20, 2005, full document (Year: 2005).*
Search Report for CH12152019, dated Feb. 10, 2020, 3 pgs.
B. Chen, et al., "Fiber Hybrid Polyimide-Based Composites Reinforced with Carbon Fiber and Poly-p-Phenylene Benzobisthiazole Fiber: Tribological Behaviors Under Sea Water Lubrication", Polymer Composites, 2016, 9 pgs.

* cited by examiner

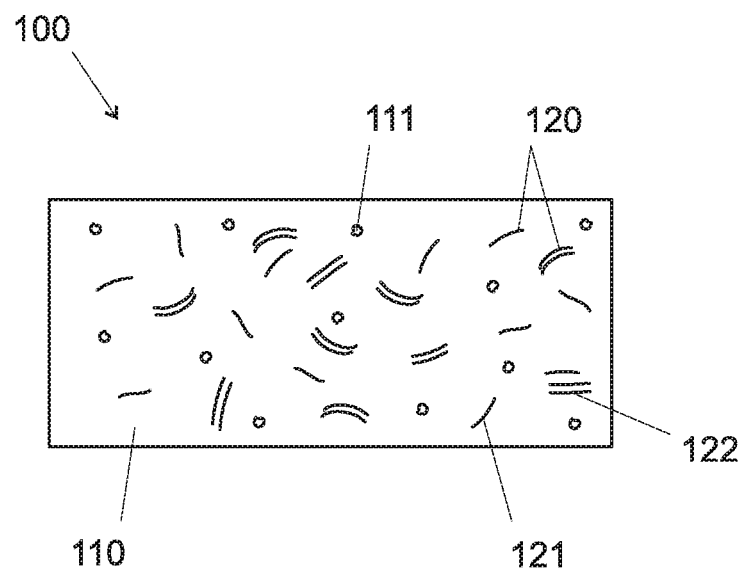

TIMEPIECE COMPONENT MADE OF FORGED COMPOSITE

RELATED APPLICATION

This application claims the benefit of Swiss Patent Application No. CH01215/19, filed on Sep. 23, 2019. The entire content of this application is hereby incorporated by reference.

TECHNICAL FIELD

The present invention relates to the field of timepiece components made of composite material.

PRIOR ART

Conventional composite materials made up of woven fibres in a polymer matrix are known, Mention may be made for example of materials based on carbon fibres, aramid fibres, basalt fibres, glass fibres or polyazole fibres (PBO), combined with a polymer resin. These materials are lightweight and have good mechanical properties. On the other hand, they are difficult to employ for small parts and for complex shapes on account of the laying-up step.

Also known are pre-impregnated composite materials in the form of carbon fibres which are deposited in a mould in successive layers and with given orientations and are then heated under high pressure to form a block or preform. Here too, complex and small parts are only produced by creating a block and machining the latter.

Also known are composite materials made up of a polymer matrix and cut fibres, mainly carbon fibres, that are deposited in a mould with the matrix before being hot-pressed; these composites are often referred to as "forged carbons". This process makes it possible to directly obtain complex parts since the laying-up step is eliminated and the part can be used without reworking.

Composites made up of carbon fibres and aramid fibres are known, the aramid fibres allowing an improvement in the mechanical properties of the carbon parts. Since aramid fibres are very difficult to cut, these composites are present exclusively in the form of fabrics and are either pre-impregnated before use or impregnated during the step of forming the desired shape.

Composites made up of a polymer matrix and a mixture of carbon fibres and glass fibres are known. The fibres can be woven or else cut and then mixed, as in the composite marketed under different brands such as Carbonium®. The glass fibres of this composite can also be aluminized or coloured for a particular aesthetic quality. The glass fibres have a similar aesthetic quality and a low cost, but their mechanical properties are inferior to those of the other fibres mentioned above, in particular PBO fibres.

Finally, liquid crystal polymer fibres are known, in particular polyazoles, including poly(p-phenylene-2,6-benzobisoxazole)-PBO, the mechanical properties of which are superior to those of aramid fibres and, for the most part, superior to those of carbon fibres.

The materials currently available do not combine all of the features desired for producing timepiece components, namely, in particular, good mechanical properties while remaining lightweight, good resistance to abrasion and impacts, easy implementation, easy machinability, suitability for producing small parts with complex geometries and various possible aesthetic qualities.

DISCLOSURE OF THE INVENTION

The aim of the invention is to propose a timepiece component based on such a material, which makes it possible in particular to produce casing parts.

This aim is achieved by a timepiece component made up of a polymer-based matrix and a reinforcement that consists of a mixture of fibres of at least two different kinds, one of which is a PBO. The mixture of fibres implies that use is made of fibres in cut form and not in woven form.

According to one variant of the invention, the second kind(s) of fibres is/are chosen from carbon fibres, basalt fibres, glass fibres, natural fibres and ceramic fibres, thereby allowing better temperature resistance (basalt), wear resistance (ceramic) or rigidity (carbon, type R glass).

According to one variant of the invention, the fibres have a length of between 2 mm and 70 mm, preferably between 4 mm and 50 mm, making it possible to produce complex parts with small dimensions.

According to one variant of the invention, the reinforcement comprises between 20% and 80% by weight PBO fibres.

According to one variant of the invention, the reinforcement comprises between 0% and 80% by weight carbon fibres.

According to one variant of the invention, the reinforcement comprises between 0% and 80% by weight basalt fibres.

According to one variant of the invention, the matrix is a thermosetting polymer.

According to one variant of the invention, the matrix is a thermoplastic polymer.

According to one variant of the invention, the mass proportion of the matrix with respect to the reinforcements is between 25% and 50%.

According to one variant of the invention, the matrix has a hardness greater than 400 HV.

According to one variant of the invention, the matrix has a temperature resistance greater than 150° C.

According to one variant of the invention, nano- or micro-fillers are added to the matrix in a proportion of between 0% and 4% by weight of the matrix.

According to one variant of the invention, the nano- or micro-fillers are chosen from carbon nanotubes, graphene, pigments, mineral fillers or particles of precious metals.

According to one variant of the invention, the pigments have an identical colour in the visible spectrum and under UV radiation.

According to one variant of the invention, the pigments have a different colour in the visible spectrum and under UV radiation.

According to one variant of the invention, the pigments have a different colour in the visible spectrum and under infrared radiation.

DESCRIPTION OF THE FIGURES

FIG. 1 is a schematic view of a timepiece component according to the invention.

EMBODIMENT OF THE INVENTION

The invention proposes a timepiece component made of a composite material 100 based on a polymer matrix 110 and a reinforcement 120 made of cut fibres made up of at least two kinds of fibres, the first fibres 121 being PBO, for example marketed under the brand Zylon®, the other, second fibre(s) 122 being selected from carbon fibres, basalt fibres, glass fibres, natural fibres, ceramic fibres or mixtures thereof.

The fibres are cut to a length of between 2 mm and 70 mm, preferably between 4 mm and 50 mm.

The different kinds of fibres can also be cut to different lengths.

An addition of micro- or nano-fillers 111 (graphene, carbon nanotubes, pigments coloured in the visible range, the UV range or the infrared range, mineral fillers or particles of precious metals such as Au or Pt) can improve certain properties of the composite material, such as mechanical, aesthetic or anti-counterfeiting properties.

One or all of the kinds of fibres may be pre-impregnated with matrix, commonly referred to as prepreg by a person skilled in the art.

The matrix 110 that is added to the reinforcement 120 to form the composite claimed by the invention may be of a thermosetting kind (epoxy, polyester, vinyl ester, polyurethane, bismaleimide etc.) or of a thermoplastic kind (nylon, polycarbonate, PPS, PEKK, PEEK, PAEK etc.).

Preferably, the matrix 110 is chosen to be of a thermosetting kind for its enhanced properties of resistance to abrasion and to impacts. The matrix, once crosslinked, will have a hardness greater than 400 HV (Vickers).

The matrix 110 could, in one version of the invention, be coloured by pigments or colorants for aesthetic reasons.

Since the fibres are disposed in a random manner, the components made of composite material that are thus obtained are unique, thereby allowing a means of identification and authentication.

An example of a process for manufacturing the timepiece component according to the invention consists, in a first step, in selecting the kinds of cut fibres and, in a second step, in combining the first kind of fibres 121 with at least one second kind of fibres 122. In a third step, the fibres are placed in a mould with the matrix 110. The matrix will represent, depending on its kind and the choice of fibres, a mass proportion in the final composite of between 25% and 45%. In a fourth step, the mould is closed. The fifth step consists in crosslinking the composite material, which is carried out using a temperature cycle (heating, stages, cooling) and under pressure (constant or variable) in order to allow the matrix 110 to fill all of the cavities of the mould. In a sixth step, the part is demoulded. An optional seventh step consists in rectifying the part and/or carrying out decorations such as sand-blasting, satin finishing, etc.

According to an advantageous variant of the invention, all of the fibres can be placed directly in the mould, the second and third steps then being merged.

The examples below illustrate different variants of the claimed timepiece component, having a mechanical strength greater than the parts produced from forged carbon, forged carbon/glass or forged basalt with a different aesthetic quality.

Example 1: Component made of a material composed of a matrix and a reinforcement such that:
  a. the matrix is an epoxy resin, representing 30% of the weight of the composite.
  b. the reinforcement is made up of a mixture of fibres:
    i. of PBO fibres, known as Zylon® grad HM, with a length of 20 mm for 40% by mass of the reinforcement.
    ii. of basalt fibres with a length of 25 mm for 5% by mass of the reinforcement.
    iii. of carbon fibres with a length of 30 mm for 55% of the reinforcement.

The reinforcement is placed in a mould that represents the negative of a timepiece component, in this case a bezel. The matrix is added and the mould is closed by the second counter-form. The mould is then placed in a hot press in order to apply a pressure and temperature cycle to allow the uniform distribution and crosslinking of the resin.

The component is then demoulded and then the upper face of the bezel is satin-finished. The component made of forged Zylon®-carbon-basalt composite is used in the assembly of a watch. This component exhibits better toughness and a lower weight compared with the equivalent part that has only a carbon reinforcement.

Example 2: Component made of a material composed of a matrix and a reinforcement such that:
  a. the matrix is an epoxy resin, representing 35% of the weight of the composite.
  b. the reinforcement is made up of a mixture of fibres:
    i. of PBO fibres with a length of 30 mm for 20% by mass.
    ii. of carbon fibres with a length of 50 mm for 45% and with a length of 35 mm for 35% by mass.

The reinforcement is placed in a mould that represents the negative of a timepiece component, in particular a bezel. Particles of precious metal, in particular gold (Au), are added at 1% by weight with respect to the reinforcement. The matrix is then added and the mould is closed by the counter-form. The process is then identical to the one in Example 1. The component made of forged PBO-carbon composite with a gold (Au) insert that is thus obtained exhibits better toughness, a different aesthetic quality and a lower weight compared with the equivalent part made of "forged carbon" that has only one reinforcement.

Example 3: Timepiece component composed of a matrix and a reinforcement such that:
  a. the matrix is a polyurethane resin representing 25% of the weight of the composite.
  b. the reinforcement is made up of a mixture of fibres:
    i. of PBO fibres with a length of 40 mm for 50% by mass.
    ii. of basalt fibres with a length of 50 mm for 50% by mass.

The reinforcement is placed in a mould that represents the negative of a timepiece component, in particular a middle. Graphene nanoparticles are added at 3% by weight with respect to the reinforcement.

The matrix is then added and the mould is closed by the other parts of the counter-form of the middle.

The rest of the process is identical to the one in Example 1. The part made of graphene-reinforced forged PEG-basalt that is thus obtained exhibits better mechanical properties, a different aesthetic quality and a lower weight compared with the equivalent part that has only a basalt reinforcement.

Example 4: Timepiece component composed of a matrix and a reinforcement such that:
  a the matrix is a polyurethane resin representing 45% of the weight of the composite. The resin is mixed beforehand with security pigments that appear white (referred to as invisible) in the visible spectrum and glow orange when illuminated by a Wood's lamp emitting at a wavelength of 365 nm, at 2% by weight with respect to the matrix.
  b. the reinforcement is made up of a mixture of fibres:
    i. of PBO fibres with a length of between 5 mm and 25 mm for 70% by mass.
    ii. of carbon fibres with a length of between 4 mm and 30 mm for 20% by mass.

iii. of glass fibres with a length of between 4 mm and 20 mm for 10% by mass.

The reinforcement is placed in a mould that represents the negative of the timepiece component, in particular a middle. The mould is closed by the other parts of the counter-form of the middle and the matrix is injection-moulded under pressure.

The rest of the process is identical to the one in Example 1. The part is then demoulded. The part made of forged Zylon®-carbon-basalt composite is used in the assembly of a watch. This component exhibits better toughness and a lower weight compared with the equivalent part that has only a carbon reinforcement. In addition, this component can be identified and authenticated under UV light when the particles glow orange.

Example 5: Timepiece component composed of a matrix and a reinforcement such that:
a. the matrix is a thermoplastic Victrex® resin composed of PEEK (PolyEtherEtherKetone) and carbon, representing 30% of the weight of the composite.
b. the reinforcement is made up of a mixture of fibres:
i. of PBO fibres with a length of between 1.0 mm and 50 mm for 80% by mass.
ii. of carbon fibres with a length of between 4 mm and 60 mm for 20% by mass.

The epoxy resin and a hardener are mixed to obtain a uniform matrix. The fibres of the reinforcement are mixed mechanically into the matrix. The matrix/reinforcement mixture is then placed in a mould that represents the negative of one of the surfaces of a timepiece component, in particular a plate. The mould is heated and then pressurized in order to allow uniform distribution of the resin in the moulded part, At the end of the pressure/temperature cycle, the part is removed from the mould and then machined by traditional means in order to obtain the desired final part.

The component exhibits a toughness and a lightness greater than a part made of 100% carbon, and a different aesthetic quality.

The invention claimed is:

1. A timepiece component made up of a polymer-based matrix and a reinforcement, wherein the reinforcement consists of fibres of at least two different kinds in cut form, one of which is a polyazole, wherein the matrix is designed for identification and authentication of the timepiece component by comprising nano- or micro-fillers in a proportion of between 0% and 4% by weight of the matrix, and by disposing the fibers in a random manner, and wherein said nano- or micro-fillers are chosen from graphene, pigments, mineral fillers or particles of precious metals.

2. The timepiece component according to claim 1, wherein the second kind(s) of fibres is/are chosen from carbon fibres, basalt fibres, glass fibres, natural fibres and ceramic fibres.

3. The timepiece component according to claim 1, wherein the fibres have a length of between 2 mm and 70 mm.

4. The timepiece component according to claim 1, wherein the fibres have a length of between 4 mm and 50 mm.

5. The timepiece component according to claim 1, wherein the reinforcement comprises between 20% and 80% by weight polyazole fibres.

6. The timepiece component according to claim 1, wherein the reinforcement comprises between 0% and 80% by weight carbon fibres.

7. The timepiece component according to claim 1, wherein the reinforcement comprises between 0% and 80% by weight basalt fibres.

8. The timepiece component according to claim 1, wherein the matrix is a polymer.

9. The timepiece component according to claim 1, wherein the mass proportion of the matrix with respect to the reinforcements is between 25% and 50%.

10. The timepiece component according to claim 1, wherein the matrix comprises pigments having an identical colour in the visible spectrum and under UV radiation.

11. The timepiece component according to claim 1, wherein the pigments have a different colour in the visible spectrum and under UV radiation.

12. The timepiece component according to claim 1, wherein the pigments have a different colour in the visible spectrum and under infrared radiation.

13. The timepiece component according to claim 1, wherein said nano- or micro-fillers are chosen from graphene or particles of precious metals.

* * * * *